United States Patent [19]

Mansson et al.

[11] 3,823,368

[45] July 9, 1974

[54] CALIBRATION AND BALANCE SYSTEM IN PULSE EDDY CURRENT TESTING APPARATUS

[75] Inventors: Sven E. Mansson, Hollviksnas, Sweden; Robert A. Brooks, Rye; Paul J. Bebick, Bronx, both of N.Y.

[73] Assignee: Magnetic Analysis Corporation, Mount Vernon, N.Y.

[22] Filed: May 8, 1973

[21] Appl. No.: 358,359

[52] U.S. Cl. .................................. 324/40, 324/37
[51] Int. Cl. ............................................ G01r 33/12
[58] Field of Search ............................... 324/37, 40

[56] References Cited
UNITED STATES PATENTS

| | | | |
|---|---|---|---|
| 2,942,178 | 6/1960 | Nerwin | 324/40 |
| 3,394,303 | 7/1968 | Cressman et al. | 324/40 |
| 3,582,772 | 6/1971 | Hammer | 324/40 |

OTHER PUBLICATIONS

"Flaw Simulator for Prope Calibration, Inst. Technology" Vol. 18, No. 4; April 1971, p. 62.

*Primary Examiner*—Robert J. Corcoran
*Attorney, Agent, or Firm*—Pennie & Edmonds

[57] ABSTRACT

The pulse eddy current testing apparatus includes test coil means having a primary winding(s) supplied with driving pulses, and a pair of secondary windings in series opposition for producing output signals varying with defects or flaws in objects under test. The output signals are supplied to an input transformer and tuned amplifier, and then through an attenuator to a pair of phase-sensitive detectors. The quadrature outputs of the detectors are supplied to an oscilloscope for indicating the amplitude and phase of the signals supplied thereto. The calibration and balance check apparatus includes a low frequency pulse source, a calibrate transformer having a primary in series with the primary winding(s) of the test coil means, a calibrate generator for receiving the outputs of the calibrate transformer and the low frequency pulse source to produce a modulated calibration check signal, and a balance generator for connection to the output circuit of the tuned amplifier and the low frequency pulse source for producing a modulated balance check signal. Switchable means in the calibration condition connects a low impedance across the primary winding(s) of the test coil means, disconnects the secondary windings from the input transformer, and supplies the calibration check signal to the input transformer to produce a calibration check indication on the oscilloscope. For balance check the test coil means is connected to the input transformer, and the balance check signal is supplied through the attenuator to the detectors to produce a balance check indication on the oscilloscope. Provision is made to standardize the displays on the oscilloscope so that proper calibration and balance are readily observed, and adjustments facilitated.

11 Claims, 5 Drawing Figures

CALIBRATION AND BALANCE SYSTEM IN PULSE EDDY CURRENT TESTING APPARATUS

BACKGROUND OF THE INVENTION

This invention relates to checking the calibration and coil balance of pulse eddy current testing apparatus.

Eddy current testing apparatus is well-known, and is particularly useful in the non-destructive testing of conductive objects to determine defects or flaws therein. In such apparatus a test coil assembly is energized to induce eddy currents in an object under test, and responds to changes in the eddy current flow to produce output signals varying with defects or flaws in the object.

In one type of apparatus objects of uniform cross section such as bars, tubes, wires, etc. are continuously passed through a primary coil in the coil assembly, and a pair of secondary coils connected in series opposition produce a null output when the eddy current field is uniform. Then, any discontinuities in the object which alter the eddy current magnitude or distribution will produce output flaw signals which are detected and indicated in a desired manner. Instead of having the object pass through the coil assembly, the assembly may be arranged as a probe which is moved relative to the surface of the object under test.

Another type of eddy current test apparatus operates as a comparator, that is, an object is placed in one set of coils and the resultant signal compared with that of a reference object placed in another set of coils. Here also, the secondary coils are commonly connected in opposition to produce a null signal when the objects are alike, and an output signal when they are unlike.

Pulse excitation of the test coil assemblies in such apparatus is known, using DC driving pulses of selected duty cycle. Different pulse recurrence frequencies (PRF's) are frequently desirable in order to detect flaws at different depths, since the penetration of the eddy currents varies with pulse width. To secure full information, a pair of phase-sensitive detectors may be employed which are gated to produce quadrature signal components so that both amplitude and phase of the defect or flaw signals may be indicated, as by a cathode ray oscilloscope display. Fixed quadrature gating pulses for the detectors frequently suffice, although sliding pairs of gating pulses may be employed if required.

The output signals from the test coil assembly are frequently applied through an input transformer to an amplifier, and then to the phase-sensitive detectors. With pulse excitation such amplifiers are preferably tuned to emphasize signals corresponding to defects or flaws, and to largely eliminate extraneous signals and noise. With pulses having a 25 percent duty cycle, tuning to the PRF is preferred, although tuning to other frequencies is possible. Reference may be made to application Ser. No. 317,140 filed Dec. 21, 1972 now U.S. Pat. No. 3,786,347 by Mansson for a further discussion of these factors. Fixed quadrature-related gate pulses occurring after each driving pulse are also disclosed in that application.

Fixed quadrature-related gate pulses may also be generated at the leading and trailing edges of 25 percent duty cycle pulses, as disclosed in application Ser. No. 332,874 filed Feb. 15, 1973 by Brooks and Bebick. Sliding quadrature-related gating pulses are described in application Ser. No. 334,960 filed Feb. 22, 1973 by Mansson.

It is frequently desirable to maintain a constant average current to the test coil assembly to take into account changes in coil impedance, etc., as described in application Ser. No. 328,889 filed Feb. 1, 1973 by Mansson.

When using apparatus such as described below, it is important to have reasonable assurance that the apparatus is functioning properly and capable of testing objects to the same quality level consistently. Also it is desirable to be able to standardize performance of instruments as they are built, and thereafter in use.

Overall performance could be checked with the aid of an external calibration standard, but such a procedure may be quite inconvenient or impractical. Thus pieces with standardized defects or flaws may be required, repeated passages at constant speed through the coil assembly may be necessary, and if adjustment is required it may be necessary to note and remember each indication in order to compare it with the next.

Heretofore check apparatus has been used with a multi-frequency sine wave eddy current testing apparatus in which the primary of the input transformer is short-circuited, a pulse modulated sine wave check signal is applied to the input of the signal amplifier, and the amplifier output supplied through phase-sensitive detectors to a cathode-ray oscilloscope. The check signal is obtained by supplying the sine wave from the sine wave power amplifier through a high resistance to an FET gated by a low frequency multi-vibrator. This enables checking the calibration of the input amplifier and subsequent circuits, but does not check the performance of the input transformer and driving circuits for the test coil assembly.

Coil balancing has been accomplished by rectifying the output of the input amplifier and supplying the rectified signal to a meter. This enables balancing the secondary coils, but does not give phase information which is of material assistance in balancing.

The present invention is particularly directed to the provision of calibration and balance check apparatus which enables the checking of a pulse eddy current testing instrument more completely and satisfactorily.

SUMMARY OF THE INVENTION

In accordance with the invention, a calibrate current transformer has its primary inserted in series with the primary winding or windings of the test coil assembly, and the output thereof is supplied to a calibrate generator along with pulses from a low frequency pulse source to produce a modulated calibration check signal. Advantageously the impedance of the calibrate transformer is low compared to that of the test coil assembly so as not to interfere with normal testing. The PRF of the low frequency pulse source is low compared to the PRF of the driving pulses applied to the test coil assembly.

For calibration, a low impedance is connected across the primary winding or windings of the test coil assembly, and the secondary windings are disconnected from the input transformer. This effectively removes the test coil assembly from the circuit during calibration, so that variations in its impedance or defects therein will not affect the calibration. The modulated calibration check signal is supplied to the input transformer and is processed by the subsequent circuits to produce a calibration check indication on the display means, preferably an oscilloscope. Both amplitude and phase are indicated. A sensitivity control, preferably an attenuator connected between the input amplifier and the phase-sensitive detectors, may be preset to yield an indication of desired amplitude if the circuits are properly adjusted and in normal operating condition. If the desired indication is not obtained, the gain and tuning of the input amplifier and the tuning of the input transformer may be adjusted, or faults located and corrected.

Inasmuch as the current through the calibrate transformer particpates in producing the modulated check signal, this calibration check not only checks the performance of the input transformer, input amplifier and subsequent circuits, but also checks the performance of the test coil driving circuits. The operation is checked at each test PRF the apparatus is designed to supply, so that proper calibration is assured at all PRF's.

For checking the balance of the test coil assembly, the assembly is connected in its normal test condition with its secondary windings connected to the input transformer. Thus any unbalance will produce a signal in the output circuit of the amplifier. A balance generator is employed which is connected to the amplifier output circuit and to the aforesaid low frequency pulse source to produce a modulated balance check signal. This signal is supplied to the phase-sensitive detectors to produce a balance check indication on the display means, preferably an oscilloscope as before stated. Thus the amplitude and phase of the unbalance signal is indicated. Advantageously the balance generator periodically connects an adjustable resistance in shunt with a portion of an attenuator in the output of the amplifier, thereby producing the modulated balance check signal which is supplied through the attenuator to the phase-sensitive detector.

In equipments having a coil balance circuit, that circuit may then be adjusted and the display of both amplitude and phase during adjustment is of material assistance. In some equipments precise balancing may not be required for proper operation, and coil balance circuits may be omitted. In such cases it may only be necessary to indicate excessive unbalance. To this end means are provided for producing a desired indication level with a known unbalance signal, so that the actual unbalance in any test coil assembly can be compared with this level.

Balance is preferably checked at all available PRF's. Also, it is desirable to check the calibration before checking the balance, particularly when only excessive out-of-balance is checked.

Switching means are provided for switching the test apparatus alternatively to test, calibration and balance check conditions.

If desired the calibration check circuits may be provided without the coil balance check circuits, but the use of both is preferred to enable a complete check of performance.

DESCRIPTION OF THE SPECIFIC EMBODIMENTS

Figure 1:
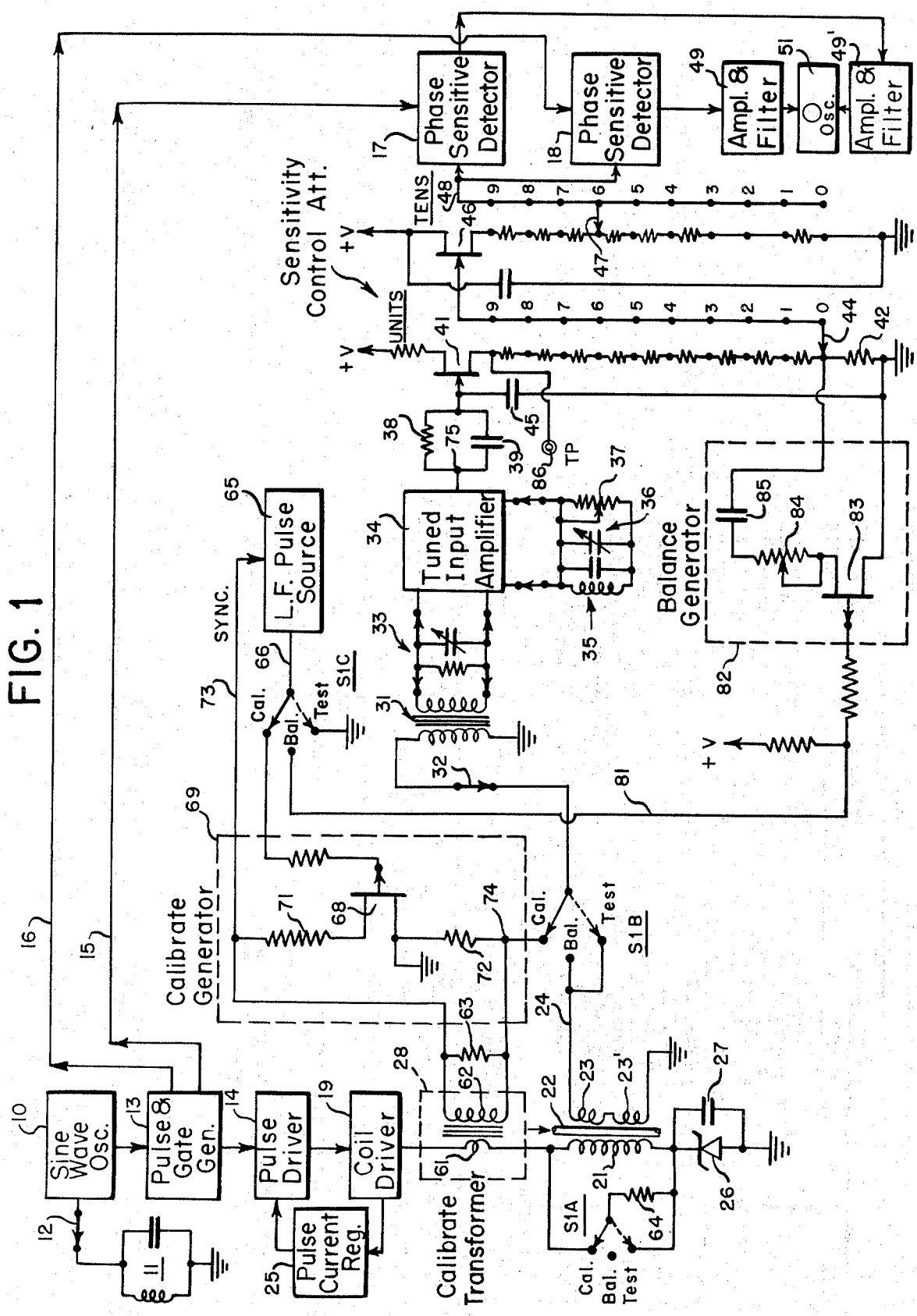
FIG. 1 is a schematic circuit diagram, partially in block form, of a pulse eddy current flaw detector incorporating the calibration and balance check feature of the invention.

Referring to FIG. 1, the apparatus will first be described in its normal condition for testing objects, with ganged switches S1A, S1B and S1C in the "Test" positions indicated by dotted lines. A sine wave oscillator 10 is turned by tank circuit 11, and different tank circuits may be alternatively connected through switch 12 to provide different operating frequencies. The sine wave is supplied to a pulse and gate generator 13 which generates pulses of desired PFR and duty cycle for pulse driver 14, and also quadrature gate pulses or "spikes" which are supplied through lines 15, 16 to phase-sensitive detectors 17, 18. The pulses from driver 14 are fed to coil driver 19 which supplies driving pulses to the primary 21 of a test coil assembly for indicating eddy currents in an object 22 passing therethrough. A pair of secondary windings 23, 23' in the test coil assembly are connected in phase opposition to produce a null, or approximately a null, signal in output line 24 in the absence of defects or flaws in the object, and an output varying in amplitude and/or phase in the presence of a flaw or other irregularity. A pulse current regulator 25 operates to maintain a substantially constant average current of the pulses supplied to primary 21, at least for lower PRF's in the ranges provided. Zener diode 26 shunted by capacitor 27 provides a discharge path for energy stored in primary 21 at the end of a driving pulse and aids in pulse shaping.

These, as well as most of the subsequent portions of the test circuits, are described in the applications above identified and need not be further described here. Also, other specific arrangements may be employed if desired. Calibrate transformer 28 will be disregarded for the moment.

In the test condition the test coil output in line 24 is connected to input transformer 31 through switch 32, and the secondary of the transformer may be tuned by a switchable circuit 33. Several switchable transformers 31 and tuning circuits 33 may be provided to accommodate the desired range of PRF's. In some cases the same transformer with different tuned circuits may be employed for different PRF's and in other cases transformers designed for particular PRF's, with only resistive loads, may be employed.

Transformer 31 is connected to input amplifier 34 tuned by a switchable circuit 35. A small vernier capacitor 36 is provided for adjusting the frequency, and a rheostat 37 for adjusting the gain. The output of the amplifier is fed through an R-C coupling circuit 38, 39 to the gate of a source follower FET 41 whose source and drain are in series with a "Units" db attenuator including end resistor 42 and intermediate resistors connected between switch points selectable by switch arm 44. Capacitor 45 forms a voltage divider with capacitor 39 to control FET 41. The output of the units attenuator is connected to the gate of a source follower FET 46 in the "Tens" db attenuator having switch points selectable by switch arm 47.

The attenuator output in line 48 is connected to the inputs of phase-sensitive detectors 17 and 18 which are gated through lines 15, 16 to produce quadrature signal components supplied to amplifier and filter circuits 49, 49' and then to the horizontal and vertical deflection circuits of oscilloscope 51. Other indicators such as alarms, lights, etc. and reject circuits may also be employed as desired in accordance with known practice.

Overall, in the test condition the apparatus functions to display on oscilloscope 51 indications of flaws and other irregularities in an object 22 in the form of a polar display yeilding both amplitude and phase information.

Considering now the calibration and balance check features to which the present invention is directed, a calibrate current transformer 28 has its primary winding 61 connected in series with the primary winding 21 of the test coil assembly so that driving pulses from coil driver 19 pass therethrough. A calibrate signal is desired for all operating frequencies of the instrument, and may extend for example from 2.5 KHz to 600 KHz.

It is important that the magnitude of the calibrate signal be consistent from unit to unit, and independent of variations in the impedance of the test coil assembly 21, 23. Also the calibrate transformer should not appreciably affect normal operation. Thus, a small resistance 64 is shunted across the primary 21 in the calibrate position which is of much lower impedance than the primary impedance so that the overall impedance is small during calibration. A 0.33 ohm resistor has been employed in one embodiment. Although a short-circuit might be employed, it is preferred to use a low resistance so that there is some load on the coil driver circuit 19 in case the regulator 25 should fail, thereby offering some protection for the coil driver. The calibrate transformer is designed to have a low impedance. In one specific embodiment the primary coil 61 had two turns and the secondary 62 had 20 turns. A 10 ohm resistor 63 was connected across the secondary to load it properly for all operating frequencies. Accordingly, low impedance of the calibrate transformer avoids any substantial effect on normal test operation.

Figure 2:
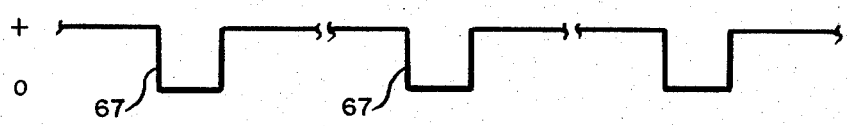
FIG. 2 is a waveform of the pulse output of the low frequency pulse generator used in checking.

A low frequency pulse source 65 is provided which yields output pulses in line 66 which are long compared to the pulses from coil driver 19, and of much lower PRF. The pulses are illustrated at 67 in FIG. 2. Desirably the pulse width is sufficient to encompass a considerable number of driving pulses so that, together with the low PRF, the test circuit capacitors, etc. reach stable operating conditions during calibration. For example, 2 millisecond pulses and a 10 to 12 Hz PRF have been employed with an instrument using 25 percent duty cycle pulses in a 2.5 KHz to 600 KHz range.

The low frequency pulses, in the CAL position of STC, are applied to the gate of an FET 68 in the calibrate generator 69. The source-drain circuit of the FET includes a large resistor 71, e.g., 10 K, and a small precision resistor 72, e.g. 10 ohms. The output of calibrate transformer 28 is connected across the series circuit comprising the FET and resistors 71, 72. The pulse source 65 may be a multivibrator with an output buffer stage, and is preferably synchronized by a signal from the calibrate transformer through line 73 to avoid jitter in the modulated signal and in the ultimate display.

At each pulse from source 65, FET 68 is turned on (conductive) so that a group of pulses from the calibrate transformer 28 pass through output resistor 72. Between pulses from source 65, the FET is cut off and becomes a high resistance. Small amplitude pulses from transformer 28 may continue to pass through resistor 72 but are not found detrimental, as will be described later. The exact shape of the pulses from calibrate transformer 28 may be different at different PRF's, and will also depend on the frequency characteristics of the transformer. This is not considered important so long as the signal at any one frequency is reasonably consistent from unit to unit.

Figure 3:
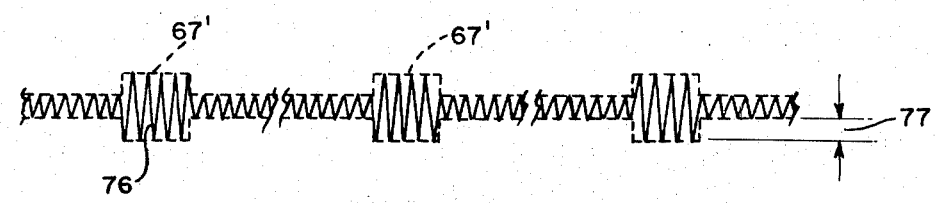
FIG. 3 illustrates a modulated calibration check signal.

The overall result of the calibrate generator 69 is to produce a modulated calibration check signal at point 74 which comprises pulses from coil driver 19 at any selected PRF, modulated by the low frequency pulses from source 65. This signal is then supplied through S1B to the input transformer 31 and then to the tuned amplifier 34. Assuming the amplifier is tuned to the PRF of the driving pulses, a modulated output will be obtained at point 75 such as illustrated in FIG. 3. Due to the tuning, an approximately sine wave frequency 76 is produced from the drive pulses, the amplitude of which markedly increases during the low frequency pulses, as indicated by envelope portions 67'. The phase and amplitude of the sine wave in portions 67' will vary with the tuning and loading of circuit 35 in the amplifier. There may of course be more cycles in each portion 67' than those shown, and the number of cycles will increase at higher PRF's of the drive pulses. The leading and trailing edges of envelope portions 67' may also be somewhat rounded, due to finite rise and decay times in the circuits.

The modulated signal of FIG. 3 passes through the attenuator to the phase-sensitive detectors 17, 18 and amplifier and filter circuits 49, 49' to oscilloscope 51. The D-C component of the modulated signal in FIG. 3 is eliminated in the subsequent circuits so that the portion 77 is the effective calibrate signal which is indicated on the face of the oscilloscope as shown at 78 in FIG. 4. Coordinate lines and circles 79, 79' may be formed in an overlay for ease of reading amplitude and phase. It will be understood that the indication 78 may vary considerably from that shown, and may be more irregular, or of spike form, etc.

For calibration, a predetermined setting of the attenuator may be selected, say at 60 as shown by the positions of sliders 44, 47. The capacitor trimmer 36 may be adjusted in a direction to close the loop 78 into as nearly a spike as possible, and at the same time maximize its amplitude. The transformer tuning circuit may also be adjusted as required. Then the trim rheostat 37 may be adjusted to give a predetermined amplitude, say to the outer circle 79' or other suitable deflection amplitude. By using the two adjustments, the desired amplitude and phase characteristics may be obtained. If phase control of the display is provided, it may be adjusted to read zero when the calibrate spike is vertical, at a selected PRF. The operation is then repeated for all PRF's. It may be noted that the angle of the loop or spike may be different for different PRF's, but is usually reasonably constant from unit to unit.

As stated before, this calibration operation checks all the electronic circuits in the equipment, including the coil driving circuits. However, it does not check the test coil assembly since that is disconnected during calibration.

The balance check insures that the test coil assembly is functioning properly. Preferably the calibration check is performed first. For balance check, the switches are turned to their "Bal" positions. S1A disconnects resistor 64 from across the test coil primary 21, and S1B connects the secondaries 23, 23' to the input transformer so that the test coil assembly is in normal operating condition. S1C disconnects the pulse source 65 from the calibrate generator 69 so that FET 68 becomes a high resistance. Calibrate transformer 28 remains in circuit, but as mentioned above its low impedance has negligible effect on operation. Any unbalance signal from coils 23, 23' will be amplified and filtered by the input amplifier 34 and appear at the input of the sensitivity control attenuator.

The balance check can be performed with or without the presence of an object 22 in the test coil assembly. If an object is used, it should be free of defects or flaws.

S1C now supplies the low frequency pulses from source 65 through line 81 to the balance generator 82. A series circuit including FET 83, rheostat 84 and capacitor 85 is connected across resistor 42 in the units attenuator. Between the pulses from source 65, FET83 has a high resistance since its gate is held positive, and the series circuit has negligible effect. However, during the pulses the resistance of FET83 is low, and places rheostat 84 effectively in shunt with resistor 42.

Any unbalance in the secondary coils 23, 23' will result in a signal across resistor 42 which is periodically reduced in value by the pulses to FET83, thereby forming a modulated calibration check signal. The degree of modulation is a function of the value of rheostat 84. This signal will be similar to FIG. 3, except that the amplitude is reduced during the pulse occurrences, rather than being increased. The signal is supplied through the subsequent circuits to produce an indication on oscilloscope 51. Inasmuch as the subsequent circuits eliminate DC components but pass signal variations, the resultant indication will be similar to that shown at 78 in FIG. 4, although the phase angle may be different.

In some equipments precise balance may be unnecessary, and only excessively unbalanced coils need be rejected. For this purpose, an AC voltage having a peak-to-peak value corresponding to the maximum unbalance voltage which is acceptable may be applied to test point 86 at the top of the units attenuator, and the attenuator set at a predetermined value, say 50. Switch arm 44 will then be as shown, whereas switch arm 47 will be at "5". Rheostat 84 is then adjusted to give a selected deflection on the oscilloscope, say to the outer circle 79' of FIG. 4, as shown. The voltage to test point 86 is then removed and the equipment switched through the various PRF's provided. If the indication stays within the outer circle with the attenuator set at 50, the coil may be considered acceptable.

Figure 5:
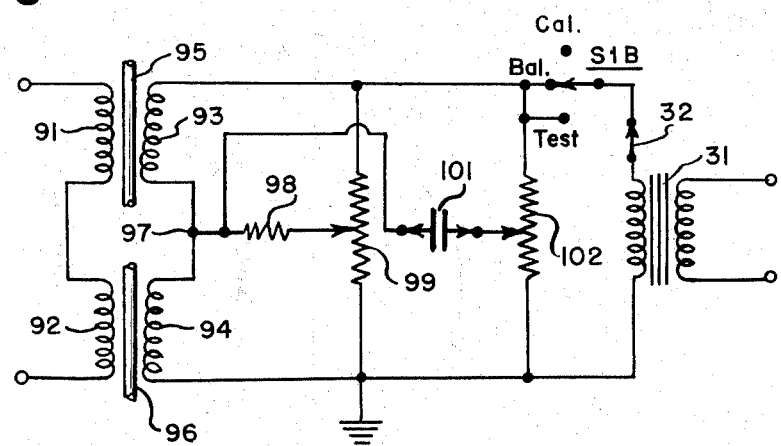
FIG. 5 illustrates a comparator circuit with coil balancing circuits.

In some equipments fairly precise coil balance may be required, and adjustments provided for the purpose. FIG. 5 illustrates such adjustments. Here a test coil assembly is shown which may be used in a comparator. A pair of test coil units have respective primaries 91, 92 connected in series and supplied with driving pulses, similar to primary 21 in FIG. 1. Respective secondary windings 93, 94 are connected in series opposition and the output supplied to switch S1B and input transformer 31.

Here object 95 is assumed to be a standard with which an object 96 is to be compared. Balance may be determined with the objects removed, or with similar objects in place. Coils 93 and 94 may yield individual outputs which differ in magnitude and/or phase. The common point 97 of the secondary coils is connected through resistor 98 to potentiometer 99 connected across the output lines. By adjusting 99, differences in magnitude may be reduced. Resistor 98 limits the range of adjustment.

The common point 97 is also connected through a capacitor 101 to potentiometer 102. By adjusting 102, differences in phase may be reduced. The value of capacitor 101 is selected to yield the desired range for phase adjustment. Since its reactance will vary with PRF, different capacitors may be switched into operation for different PRF's.

The coil balancing circuit may be used with the coils 23, 23' of the test coil assembly of FIG. 1. Also other balancing arrangements may be employed if desired.

Figure 4:
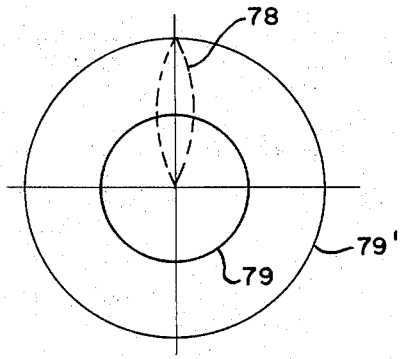
FIG. 4 illustrates an oscilloscope display used in calibration.

Assuming suitable coil balancing circuits, and the apparatus of FIG. 1 in the balance condition, the balancing adjustments may be made until the indication 78 of FIG. 4 is as small as possible, ideally a dot, or at least sufficiently small to yield satisfactory operation under normal test conditions. There is likely to be some interaction between amplitude and phase adjustments, and repeated adjustments may be required before a satisfactory balance is obtained. The display of both amplitude and phase of FIG. 4 is of material assistance in guiding the operator, since the effect of each adjustment is visible and counteracting adjustments more easily avoided. Thus satisfactory balancing can be obtained more rapidly, which is particularly important when a number of different PRF's must be checked.

After the calibration and balancing checks have been made, the switches are set to their test position, ready for operation. Inasmuch as the checks are fairly easy and convenient to make, the equipment can be checked frequently to make sure it is operating properly.

The invention has been described in connection with specific embodiments thereof. It will be understood that changes in the detailed check circuits may be made if desired, and the check circuits adapted to the particular pulse eddy current testing apparatus which is to be checked. If desired, the balance check circuits may be eliminated, although the use of both calibration and balance check circuits is preferred in order to obtain a more complete check on overall performance.

We claim:

1. In pulse eddy current testing apparatus including test pulse generating means, test coil means having primary winding means supplied with driving pulses from said test pulse generating means and secondary winding means for producing output signals varying with defects or flaws in objects under test, an input transformer connected with said secondary winding means and in turn connected with a tuned amplifier for amplifying said output signals, a pair of phase-sensitive detectors supplied with quadrature gating signals and with the output of said tuned amplifier for producing quadrature signal components therefrom, and display means supplied from said phase-sensitive detectors for indicating the amplitude and phase of signals supplied thereto, calibration check apparatus which comprises a. a low frequency pulse source having a PRF low compared to the PRF of said test pulse generating means, b. a calibrate transformer having a primary in series with the primary winding means of said test coil means, c. a calibrate generator for receiving the outputs of said calibrate transformer and low frequency pulse source to produce a modulated calibration check signal, d. and switchable means for switching said test apparatus alternatively to test and calibration check conditions, e. said switchable means in the test condition thereof enabling said test apparatus for detecting defects or flaws in objects under test and inhibiting the supply of said modulated calibration check signal to said test apparatus, f. said switchable means in the calibration check condition thereof including means for connecting a low impedance across said primary winding means of the test coil means, disconnecting said secondary winding means from said input transformer, and supplying said modulated calibration check signal to said input transformer to thereby produce a calibration check indication on said display means.

2. Apparatus according to claim 1 in which the input impedance of said calibrate transformer is small compared to the input impedance of said test coil means.

3. Apparatus according to claim 2 in which said display means is a cathode-ray oscilloscope.

4. In pulse eddy current testing apparatus including test pulse generating means, test coil means having primary winding means supplied with driving pulses from said test pulse generating means and a plurality of secondary windings for producing output signals varying with defects or flaws in objects under test, said secondary windings being connected in series opposition with respect to voltages induced therein from said primary winding means, an input transformer connected with said secondary windings and in turn connected with a tuned amplifier for amplifying said output signals, a pair of phase-sensitive detectors supplied with quadrature gating signals and with the output of said tuned amplifier for producing quadrature signal components therefrom, and display means supplied from said phase-sensitive detectors for indicating the amplitude and phase of signals supplied thereto, calibration and balance check apparatus which comprises a. a low frequency pulse source having a PRF low compared to the PRF of said test pulse generating means, b. a calibrate transformer having a primary in series with the primary winding means of said test coil means, c. a calibrate generator for receiving the outputs of said calibrate transformer and low frequency pulse source to produce a modulated calibration check signal, d. a balance generator for connection with said low frequency pulse source and with the output circuit of said tuned amplifier for producing a modulated balance check signal when an unbalance signal occurs in said output circuit, e. and switchable means for switching said test apparatus alternatively to test, calibration and balance check conditions, f. said switchable means in the test condition thereof enabling said test apparatus for detecting defects or flaws in objects under test and inhibiting the supply of said modulated calibration and balance check signals to said test apparatus, g. said switchable means in the calibration check condition thereof including means for connecting a low impedance across said primary winding means of the test coil means, disconnecting said secondary windings thereof from said input transformer, and supplying said modulated calibration check signal to said input transformer to thereby produce a calibration check indication on said display means, h. said switchable means in the balance check condition thereof including means for connecting said secondary windings of the test coil means to said input transformer, enabling said balance generator for producing said modulated balance check signal, and supplying said modulated balance check signal to said phase-sensitive detectors to thereby produce a balance check indication on said display means.

5. Apparatus according to claim 4 in which the input impedance of said calibrate transformer is small compared to the input impedance of said test coil means.

6. Apparatus according to claim 4 including a resistance attenuator connected between the output of said tuned amplifier and said phase-sensitive detectors, said balance generator including means for alternately connecting and substantially disconnecting a shunt resistance across a portion of said resistance attenuator in response to pulses from said low frequency pulse source.

7. Apparatus according to claim 6 including means for applying a predetermined A-C voltage across at least a portion of said resistance attenuator, said shunt resistance being adjustable to produce a predetermined indication on said display means for said predetermined A-C voltage.

8. Apparatus according to claim 7 in which said display means is a cathode-ray oscilloscope.

9. Apparatus according to claim 8 in which the input impedance of said calibrate transformer is small compared to the input impedance of said test coil means.

10. In pulse eddy current testing apparatus including test pulse generating means, test coil means supplied with driving pulses from said test pulse generating means for inducing eddy currents in an object under test and producing output signals varying with defects or flaws in the object, an input transformer connected with said test coil means and in turn connected with a tuned amplifier for amplifying said output signals, a pair of phase-sensitive detectors supplied with quadrature gating signals and with the output of said tuned amplifier for producing quadrature signal components therefrom, and display means supplied from said phase-sensitive detectors for indicating the amplitude and phase of signals supplied thereto, calibration check apparatus which comprises a. a low frequency pulse source having a PRF low compared to the PRF of said test pulse generating means, b. a calibrate transformer having a primary in series with the supply of driving pulses to said test coil means,
c. a calibrate generator for receiving the output of said calibrate transformer and low frequency pulse source to produce a modulated calibration check signal,
d. and switchable means for switching said test apparatus alternatively to test and calibration check conditions,
e. said switchable means in the test condition thereof enabling said test apparatus for detecting defects or flaws in objects under test and inhibiting the supply of said modulated calibration check signal to said test apparatus,
f. said switchable means in the calibration check condition thereof including means for substantially eliminating the flow of driving pulses to said test coil means and establishing a conductive path of low impedance for said pulses, disconnecting said test coil means from said input transformer, and supplying said modulated calibration check signal to said input transformer to thereby produce a calibration check indication on said display means.

11. Apparatus according to claim 10 including
a. a balance generator for connection with said low frequency pulse source and with the output circuit of said tuned amplifier for producing a modulated balance check signal when an unbalance signal occurs in said output circuit,
b. said switchable means including means for switching said test apparatus alternatively to a balance check condition,
c. said switchable means in the balance check condition thereof leaving said test coil means supplied with driving pulses and connected with said input transformer as in the test condition thereof, and including means for enabling said balance generator for producing said modulated balance check signal, and supplying said modulated balance check signal to said phase-sensitive detectors to thereby produce a balance check indication on said display means.

* * * * *